(12) United States Patent
McClure et al.

(10) Patent No.: US 11,378,059 B2
(45) Date of Patent: Jul. 5, 2022

(54) SYSTEM AND METHOD FOR CONTROLLING A GENERATOR OF A WIND TURBINE USING ELECTRICAL CURRENT

(71) Applicant: General Electric Company, Schenectady, NY (US)

(72) Inventors: Michael Graham McClure, Schenectady, NY (US); Ramy Souri, Greer, SC (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 16/679,802

(22) Filed: Nov. 11, 2019

(65) Prior Publication Data

US 2021/0140406 A1 May 13, 2021

(51) Int. Cl.
*F03D 7/02* (2006.01)
*F03D 9/25* (2016.01)

(52) U.S. Cl.
CPC ......... *F03D 7/0272* (2013.01); *F03D 7/0224* (2013.01); *F03D 7/0276* (2013.01); *F03D 9/255* (2017.02)

(58) Field of Classification Search
CPC ...... F03D 17/00; F03D 7/0224; F03D 7/0272; F03D 7/0276; F03D 7/028; F03D 9/255; F05B 2270/327; H02P 2101/15; H02P 9/006; H02P 9/007; H02P 9/06; H02P 9/102; Y02E 10/72
See application file for complete search history.

(56) References Cited

U.S. PATENT DOCUMENTS

| 6,921,985 B2 | 7/2005 | Janssen et al. | |
|---|---|---|---|
| 7,586,206 B2 | 9/2009 | Barton et al. | |
| 8,624,422 B2 | 1/2014 | Miranda | |
| 9,163,610 B2 | 10/2015 | Quottrup | |
| 9,548,690 B2 | 1/2017 | Ren et al. | |
| 2006/0273595 A1* | 12/2006 | Avagliano | H02J 3/386 290/44 |
| 2016/0341179 A1* | 11/2016 | Klodowski | F03D 7/042 |
| 2019/0081473 A1 | 3/2019 | Shaqqo et al. | |

FOREIGN PATENT DOCUMENTS

EP 3690234 A2 8/2020

OTHER PUBLICATIONS

European Search Report for EP Application No. 20206975.3, dated Apr. 20, 2021.

* cited by examiner

*Primary Examiner* — Tulsidas C Patel
*Assistant Examiner* — S. Mikailoff
(74) *Attorney, Agent, or Firm* — Dority & Manning, P.A.

(57) ABSTRACT

A system and method are provided for controlling a wind. Accordingly, a current condition of a generator of the wind turbine is determined, and an approach of the current condition to a current-dependent limit is detected. The speed of the generator is affected so as to alter a rotor/stator balance of the generator such that the current-dependent limit is not exceeded and the wind turbine can operate at a rated power.

16 Claims, 6 Drawing Sheets

SYSTEM AND METHOD FOR CONTROLLING A GENERATOR OF A WIND TURBINE USING ELECTRICAL CURRENT

FIELD

The present disclosure relates in general to wind turbines, and more particularly to systems and methods for controlling wind turbines based on a current condition of a generator of the wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be transmitted to a converter and/or a transformer housed within the tower and subsequently deployed to a utility grid.

When installed, the wind turbine may have a nominal power rating based on the electrical generating capacity of the generator and corresponding components for a given operational envelope. Typically, the generator spins at a constant rotational speed so as to provide the nominal rated power for all anticipated grid and environmental conditions within the operational envelope of the wind turbine. As such, the generator is generally sized to provide the nominal rated power without a current condition of the generator ever approaching a current-dependent limit for the generator. Such sizing may require the generator to be larger than would otherwise be required to produce the nominal rated power. Thus, while the physical attributes of the generator may permit the generator to generate power in excess of the nominal rated power, doing so may result in current conditions of the generator being more likely to encounter a design limit for the generator.

Over the lifespan of the wind turbine, the wind turbine may be upgraded with components to allow the wind turbine to have an upgraded power rating. In other words, the upgraded wind turbine may be marketed as having the ability to produce more electricity than was producible when installed. This upgraded power rating is, however, limited by the generator's ability to generate power at the desired rating, for the given operational envelope, without encountering design limits. Typically, if design limits are approached, the generator may begin to be de-rated resulting in power production below the desired level for the given conditions. This may, in turn, establish an upper limit on the upgraded power rating of the wind turbine.

For example, a wind turbine may have a nominal power rating of 1.6 MW and it may be desirable to upgrade the wind turbine so as to market the wind turbine as being able to provide 1.95 MW to the electrical grid. However, attempting to provide 1.95 MW with the generator having a constant rotational speed may result in the current of the generator reaching design limits, thereby requiring the generator to be de-rated. In such a situation, the de-rating may necessitate marketing the wind turbine as only being able to provide 1.85 MW to the electrical grid throughout the operational envelope of the wind turbine.

Thus, the art is continuously seeking new and improved systems to control the wind turbine and operate the generator closer to design limits without de-rating the generator. Accordingly, the present disclosure is directed to systems and methods for controlling a wind turbine so as to adjust the speed of the generator and alter a rotor/stator balance.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The method may include determining, via a controller, a current condition of the generator of the wind turbine. The method may also include detecting, with the controller, an approach of the current condition to a current-dependent limit. Additionally, the method may include affecting a speed of the generator so as to alter a rotor/stator balance of the generator such that the current-dependent limit is not exceeded and the wind turbine can operate at a rated power.

In an embodiment, the method may also include receiving, with the controller, data indicative of an electrical grid condition. The method may also include receiving, with the controller, data indicative of an environmental condition. The current condition may be dependent, at least in part, on the grid condition and the environmental condition.

In an embodiment, the current-dependent limit may be a high-speed limit corresponding to a rotor current limit of the generator. In an additional embodiment, affecting the speed of the generator may include adjusting an operating parameter of the wind turbine so as to slow a shaft speed of the generator.

In a further embodiment, adjusting the operating parameter of the wind turbine may include receiving, with the controller, data indicative of an environmental condition. The method may also include receiving, with the controller, a pitch setpoint indication for a rotor of the wind turbine at the determined environmental condition. Additionally, the method may include receiving, with the controller, data indicative of a rotational speed for a high-speed shaft of the wind turbine. The method may further include selecting, with the controller, the operating parameter for adjustment based on the pitch setpoint of the rotor, the rotational speed of the high-speed shaft, and the current condition of the generator.

In an embodiment, adjusting the operating parameter of the wind turbine may include increasing the torque of the generator.

In an embodiment, adjusting the operating parameter of the wind turbine may also include pitching at least one rotor blade of the wind turbine so as to decelerate the rotor of the wind turbine for the determined environmental condition.

In an additional embodiment, the current-dependent limit may be a low-speed limit corresponding to a stator current limit. In an embodiment, affecting the speed of the generator may also include adjusting an operating parameter of the wind turbine so as to increase a shaft speed of the generator. In a further embodiment, adjusting the operating parameter may include determining, with the controller, data indicative of an environmental condition. The method may include receiving, with the controller, a pitch setpoint indication for a rotor of the wind turbine at the determined environmental condition. The method may include receiving, with the controller, data indicative of a rotational speed for a high-speed shaft of the wind turbine. The method may further include selecting, with the controller, the operating parameter for adjustment based on the pitch setpoint of the rotor, the rotational speed of the high-speed shaft, and the current condition.

In a further embodiment, adjusting the operating parameter of the wind turbine may include decreasing the torque the generator.

Additionally, in an embodiment, adjusting the operating parameter of the wind turbine may also include pitching at least one rotor blade of the wind turbine so as to accelerate the rotor of the wind turbine for the determined environmental condition.

In an embodiment, the method may include establishing a power output of the generator which is greater than a designated power rating for the generator.

In another aspect, the present disclosure is directed to a system for controlling a wind turbine. The system may include a current sensor operably coupled to a generator of a wind turbine. The system may also include a converter controller operably coupled to the current sensor and the generator. The converter controller may be configured to determine a current condition of the generator and to detect an approach of the current condition to a current-dependent limit. The system may also include a turbine controller operably coupled to the converter controller. The turbine controller may be configured to affect the speed of the generator such that the current-dependent limit is not exceeded and the wind turbine can operate at a rated power.

In an embodiment, the system may also include a grid sensor operably coupled to an electrical power grid and to the converter controller or the turbine controller. The grid sensor may be configured to detect a grid condition anticipated to drive the current condition to the current-dependent limit.

In an embodiment, the system may also include an environmental sensor operably coupled to the turbine controller for gathering data indicative of an environmental condition. The environmental sensor may be configured to detect an environmental condition anticipated to drive the current condition to the current-dependent limit.

In an additional embodiment, the system may also include a pitch sensor operably coupled to at least one rotor blade of the wind turbine and the turbine controller. The pitch sensor may be configured to communicate a pitch setpoint indication to the turbine controller. The system may include a rotational speed sensor operably coupled to the turbine controller. The rotational speed sensor may be directed at a high-speed shaft of the wind turbine. The turbine controller may be configured to select an operating parameter to adjust so as to affect the speed of the generator based at least on the pitch setpoint of the rotor, the rotational speed of the high-speed shaft, and the current condition.

In an embodiment, the system may include a blade pitch control mechanism operably coupled to the blade(s) of the wind turbine so as to establish the pitch setpoint.

In a further embodiment, the system may include a converter operably coupled to the generator in the turbine controller. The converter may be configured to increase or decrease a torque parameter of the generator so as to reduce or increase a generator speed setpoint.

In another aspect, the present disclosure is directed to a method for upgrading a power production capability of a wind turbine. The method may include operating a generator of the wind turbine at a new rated power which is greater than a nominal power rating for the generator. The method may also include determining, with a controller, a current condition of the generator. The method may include detecting, with the controller, an approach of the current condition to a current-dependent limit. Additionally, the method may include affecting a speed of the generator so as to alter a rotor/stator balance of the generator such that the current-dependent limit is not exceeded in the wind turbine can operate at the new rated power.

It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine. In particular, the present disclosure may include a system and method which may facilitate the operation of an upgraded wind turbine at higher rated powers than the nominal power rating present when the wind turbine was installed. The systems and methods disclosed herein may be particularly applicable when a converter-generator system approaches a sub-optimal condition which reduces efficiency or capability of the system. This may be brought about by the system reaching or approaching undesirable operation based on current, voltage, or system level efficiency. In particular, the present disclosure may include determining a current condition of the generator of the wind turbine. This current condition may then be compared to a current-dependent limit of the generator. In an embodiment, the current-dependent limit may be a limit or threshold associated with the amount of current which may be passed through windings of either the rotor or the stator of the generator. For example, this may be the amount of current which may be passed through the windings without generating an unacceptable amount of heat in the component. Additionally, this may also be the level of current which may be passed before the magnetic field generated by the component becomes unstable in relation to the magnetic field produced by the opposing component. If the current condition approaches the current-dependent limit of the rotor, the controller may affect the speed of the generator so as to slow the rotor and thereby decrease the current passing through the rotor while increasing the current passing through the stator. On the other hand, the speed of the generator may be increased if the current condition approaches the current-dependent limit of the stator. In order to affect the generator speed, for example, a turbine controller may affect an operating parameter of the wind turbine such as the pitch setpoint of the wind turbine rotor, the rotational speed of the high-speed shaft, and/or the torque of the generator.

It should be appreciated that operating the generator at varying rotational speeds may permit a rebalancing of the rotor/stator balance. The rebalancing of the rotor/stator balance may, in turn, permit the operation of the wind turbine at a greater rated power throughout the operational envelope of the wind turbine by eliminating or postponing the crossing of a current-dependent limit for the given rated power. It should be further appreciated that rebalancing the rotor/stator balance may improve the efficiency and/or capability of the system.

Figure 1:
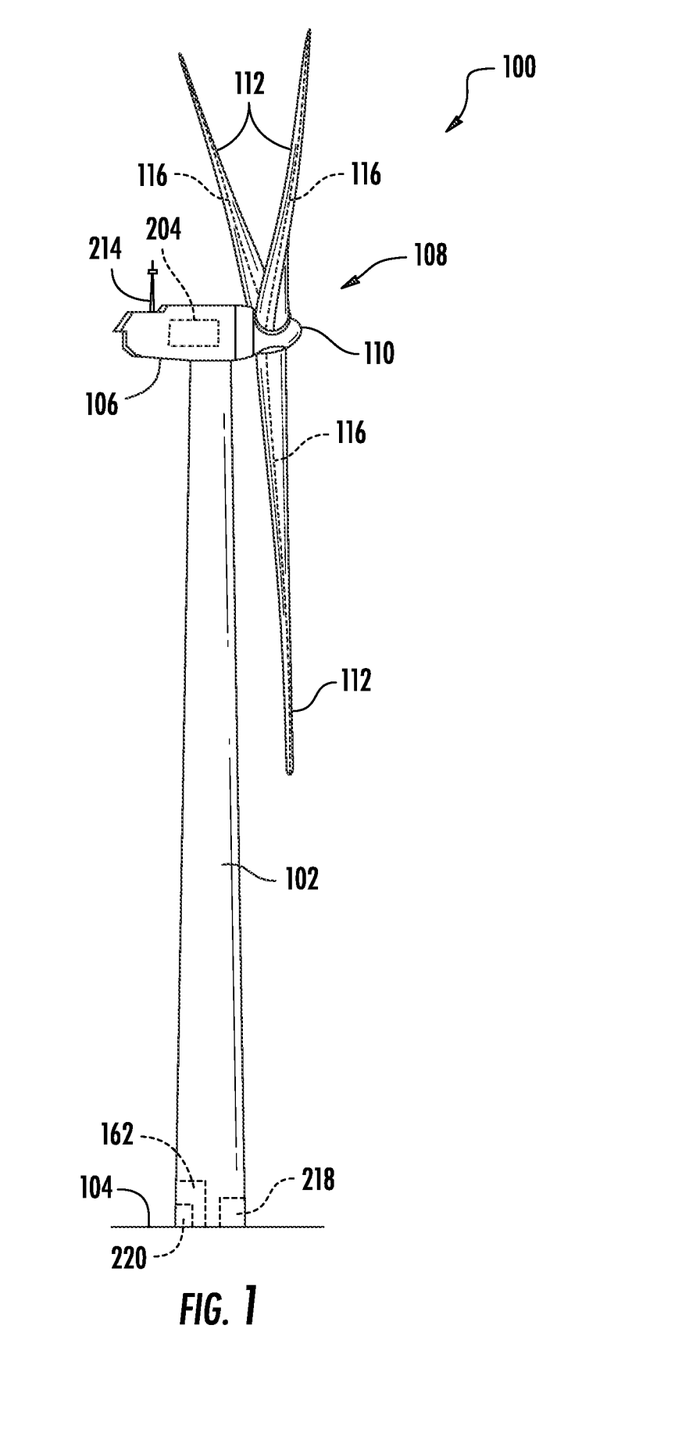
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 2:
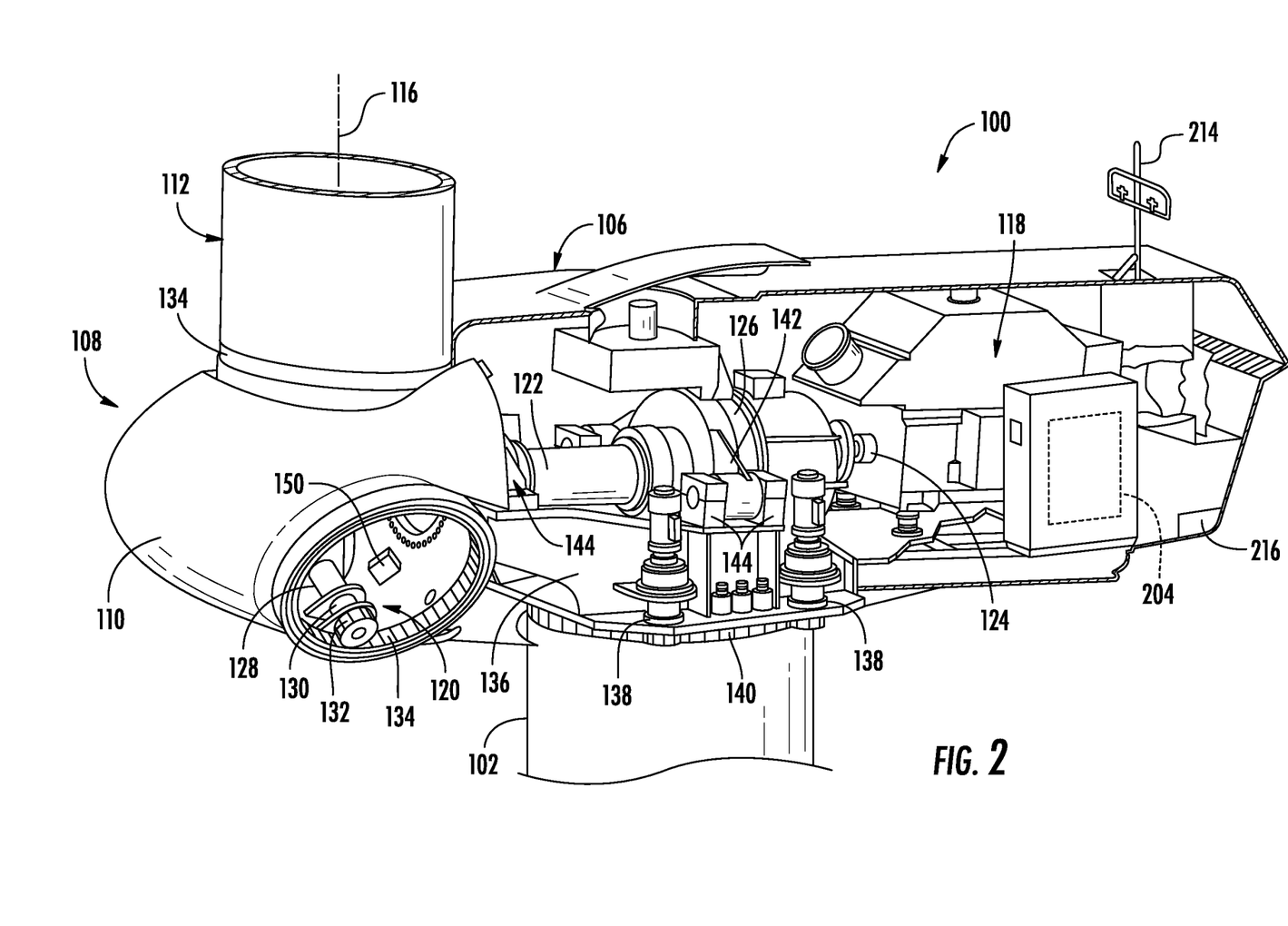
FIG. 2 illustrates a perspective, internal view of a nacelle of a wind turbine according to one embodiment of the present disclosure.
Figure 3:
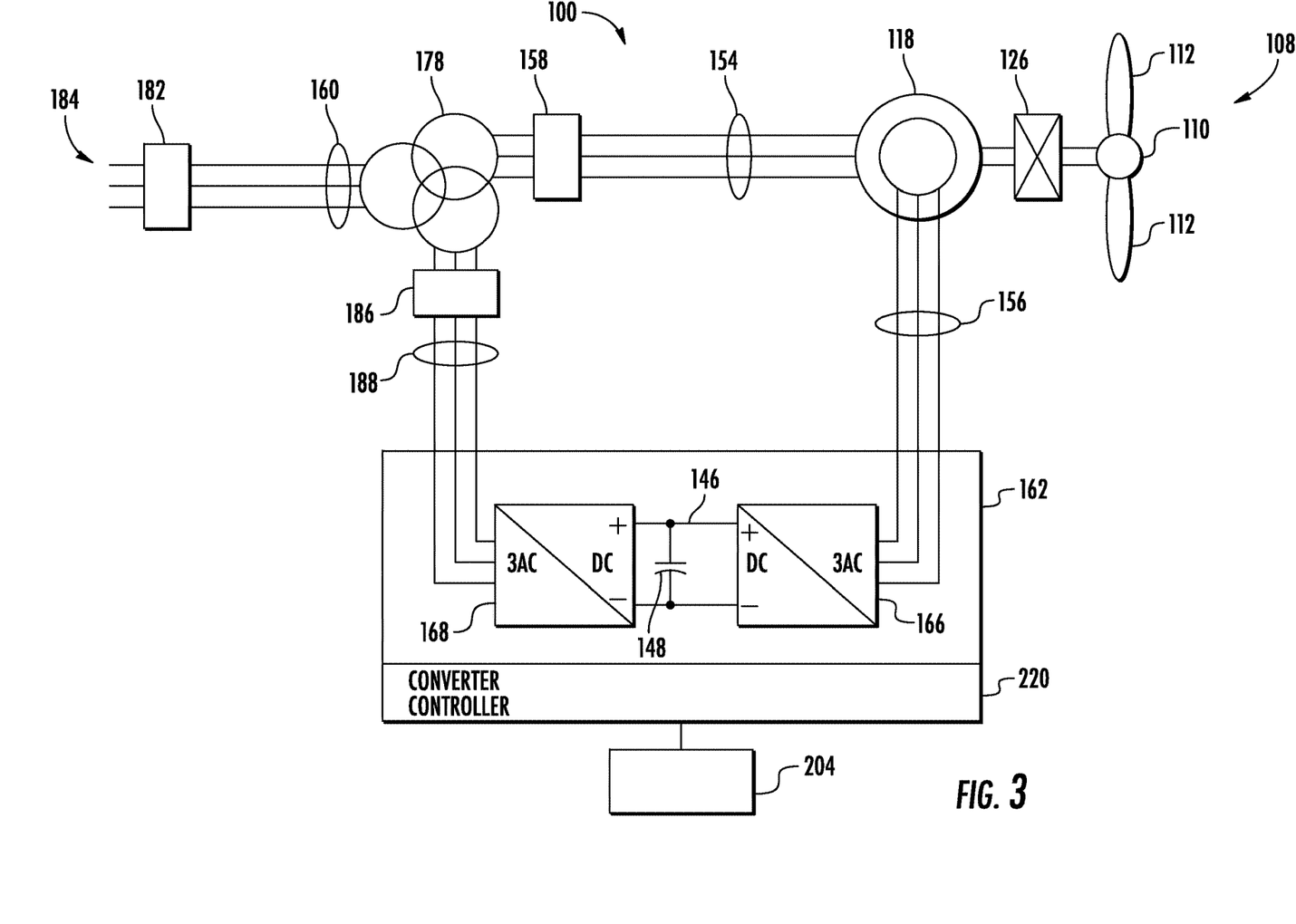
FIG. 3 illustrates a schematic diagram of one embodiment of a wind turbine power system according to the present disclosure.

The wind turbine 100 may also include a controller 202 (FIGS. 2 and 3). In an embodiment, the controller 202 may be a wind turbine controller 204 centralized within the nacelle 106. However, in other embodiments, the controller 202 may be located within any other component of the wind turbine 100 or at a location outside the wind turbine. Further, the controller 202 may be communicatively coupled to any number of the components of the wind turbine 100 in order to control the components. As such, the controller 202 may include a computer or other suitable processing unit. Thus, in several embodiments, the controller 202 may include suitable computer-readable instructions that, when implemented, configure the controller 202 to perform various different functions, such as receiving, transmitting and/or executing wind turbine control signals.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 202. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 202, with each yaw drive mechanism(s) 138 being configured to change the angle of the nacelle 106 relative to the wind (e.g., by engaging a yaw bearing 140 of the wind turbine 100).

The rotation of each rotor blade 112 about its pitch axis 116 by its respective pitch control mechanism 120 may establish a pitch angle for each of the rotor blades 112. In an embodiment, the pitch angle may be an angular deviation from a zero-pitch location. The zero-pitch location may, for example, be established during blade installation through reliance on a mechanical reference at the blade root or a protrusion which triggers a limit switch to automate the calibration process. The controller 202 may track the pitch angle of the rotor blade(s) 112 based on a cumulative deviation from the zero-pitch location. The controller 202 may, thus, transmit the pitch setpoint command(s) to the pitch control mechanisms 120 directing that the rotor blade(s) 112 be rotated through a specified number of degrees, as interpreted by a motor mounted encoder, relative to the perceived pitch angle of the rotor blade(s) 112.

Still referring to FIG. 2, one or more sensors 214, 216, 218 (FIG. 1) may be provided on the wind turbine 100 to monitor the performance of the wind turbine 100 and/or environmental conditions affecting the wind turbine 100. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 202 to determine the condition.

Referring back to FIG. 3, in at least one embodiment, the generator 118 may be a Doubly-Fed Induction Generator (DFIG). Further, the generator 118 may include a rotor and a stator and may be coupled to a stator bus 154 and a power converter 162 via a rotor bus 156. The stator bus 154 may provide an output multiphase power (e.g. three-phase power) from a stator of the generator 118 and the rotor bus 156 may provide an output multiphase power (e.g. three-phase power) of a rotor of the generator 118. Referring to the power converter 162, generator 118 may be coupled via the rotor bus 156 to a rotor side converter 166. The rotor side converter 166 may be coupled to a line side converter 168 which in turn may be coupled to a rotor bus 188.

In an embodiment, the rotor side converter 166 and the line side converter 168 may be configured for normal operating mode in a three-phase, pulse width modulation (PWM) arrangement using insulated gate bipolar transistor (IGBT) or similar switching elements. The rotor side converter 166 and the line side converter 168 may be coupled via a DC link 146 across which is the DC link capacitor 148. In an embodiment, a transformer 178, such as a three-winding transformer, can be coupled to the rotor bus 188, the stator bus 154, and a system bus 160. The transformer 178 can convert the voltage of power from the rotor bus 188 and the stator bus 154 to a voltage suitable for providing to an electrical grid 184 via system bus 160.

The power converter 162 may be coupled to a controller 202 to control the operation of the rotor side converter 166 and the line side converter 168 as a converter controller 220. It should be noted that the converter controller 220, in may be configured as an interface between the power converter 162 and the turbine controller 204. In one implementation, the converter controller 220 may include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162.

In operation, alternating current power generated at generator 118 by rotation of the rotor 108 may be provided via a dual path to electrical grid 184. The dual paths may be defined by the stator bus 154 and the rotor bus 156. On the rotor bus side 156, sinusoidal multi-phase (e.g. three-phase) alternating current (AC) power may be provided to the power converter 162. The rotor side power converter 166 may convert the AC power provided from the rotor bus 156 into direct current (DC) power and provide the DC power to the DC link 146. Switching elements (e.g. IGBTs) used in bridge circuits of the rotor side power converter 166 may be modulated to convert the AC power provided from the rotor bus 156 into DC power suitable for the DC link 146.

The line side converter 168 may convert the DC power on the DC link 146 into AC output power suitable for the electrical grid 184, such as AC power synchronous to the electrical grid 184, which may be transformed by transformer 178 before being provided to the electrical grid 184. In particular, switching elements (e.g. IGBTs) used in bridge circuits of the line side power converter 168 may be modulated to convert the DC power on the DC link 146 into AC power on the line rotor bus 188. The AC power from the power converter 162 may be combined with the power from the stator of generator 118 to provide multi-phase power (e.g. three-phase power) having a frequency maintained substantially at the frequency of the electrical grid 184 (e.g. 50 Hz/60 Hz).

The power converter 162 may receive control signals from, for instance, the converter controller 220. The control signals may be based, among other things, on sensed conditions or operating characteristics of the wind turbine 100. The control signals may provide for control of the operation of the power converter 162. For example, feedback in the form of sensed speed of the generator 118 may be used to control the conversion of the output power from the rotor bus 156 to maintain a proper and balanced multi-phase (e.g. three-phase) power supply. Other feedback from other sensors may also be used by the converter controller 220 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

In some implementations, power converter 162 may be controlled to produce reactive power in order to meet a reactive power production requirement. The reactive power production requirement may be received as a grid signal in order to satisfy a grid condition of the connected electrical grid 184.

Various circuit breakers and switches, such as a line bus breaker 186, stator bus breaker 158, and grid breaker 182 can be included in the wind turbine 100 to connect or disconnect corresponding buses, for example, when current flow is excessive and can damage components of the wind turbine 100 or for other operational considerations. Additional protection components can also be included in the wind turbine 100.

Figure 4:
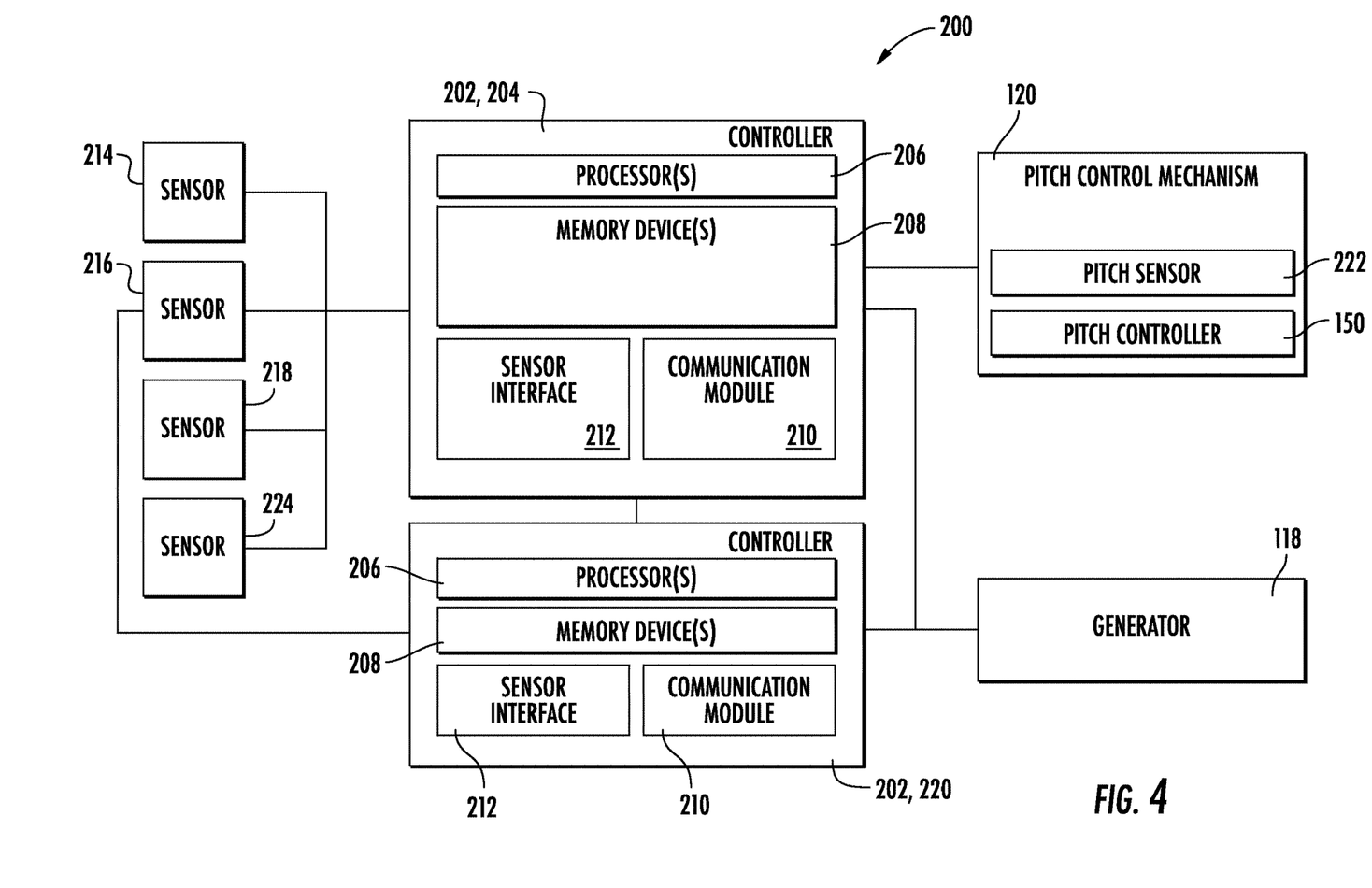
FIG. 4 illustrates a schematic diagram of one embodiment of a system for operating a wind turbine according to the present disclosure, particularly illustrating a schematic diagram of a controller of the wind turbine.
Figure 5:
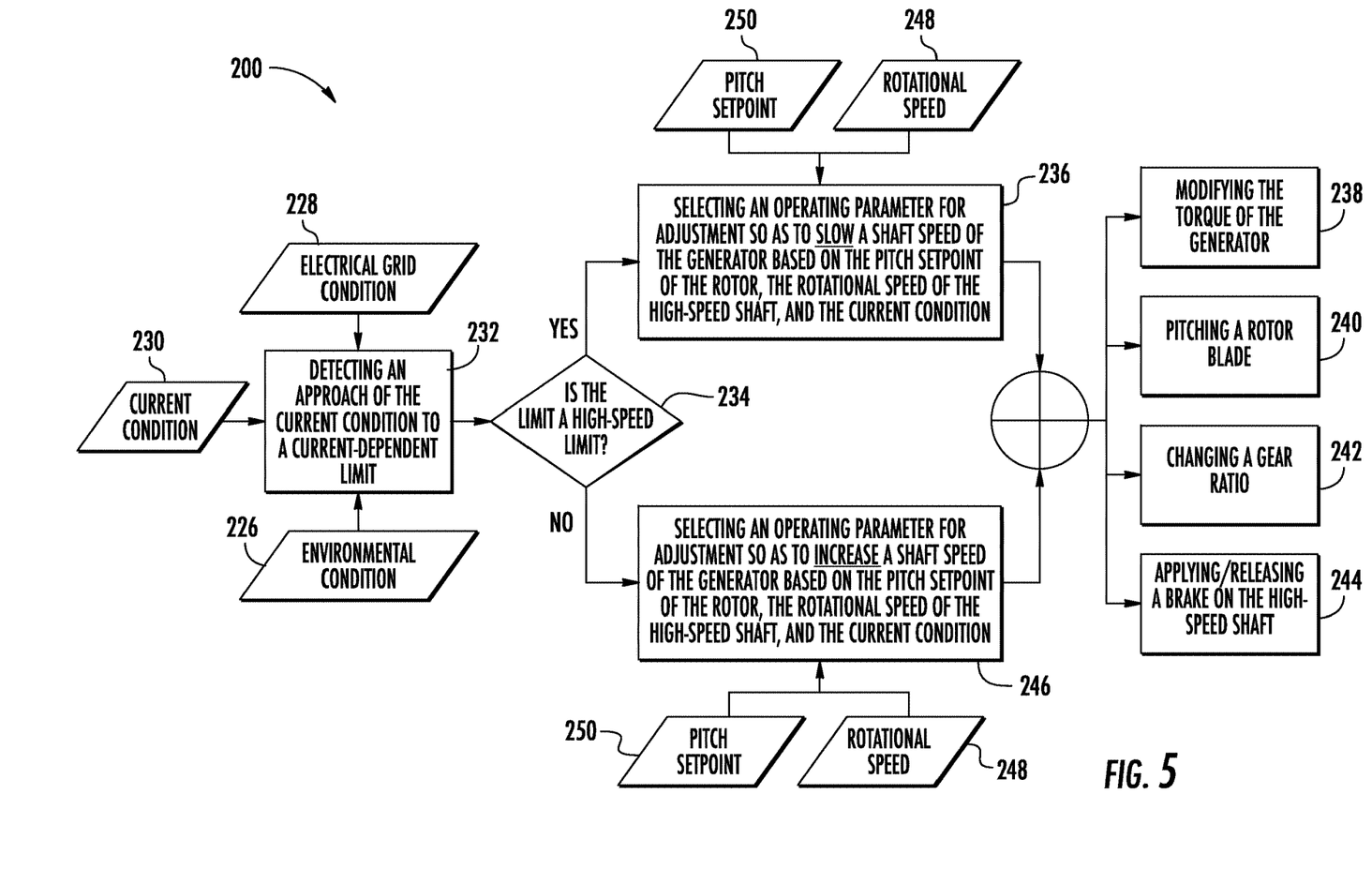
FIG. 5 illustrates a schematic diagram of one embodiment of a control logic of a system for operating a wind turbine according to the present disclosure.

Referring now to FIGS. 4-5, schematic diagrams of multiple embodiments of a system 200 for controlling a wind turbine 100 according to the present disclosure are presented. As shown particularly in FIG. 4, suitable components may be included within the controller 202 according to the present disclosure. For example, as shown, the controller 202 may include one or more processor(s) 206 and associated memory device(s) 208 configured to perform a variety of computer-implemented functions (e.g., performing the methods, steps, calculations and the like and storing relevant data as disclosed herein). Additionally, the controller 202 may also include a communications module 210 to facilitate communications between the controller 202 and the various components of the wind turbine 100. Further, the communications module 210 may include a sensor interface 212 (e.g., one or more analog-to-digital converters) to permit signals transmitted from one or more sensors 214, 216, 218, 224 to be converted into signals that can be understood and processed by the processors 206. It should be appreciated that the sensors 214, 216, 218, 224 may be communicatively coupled to the communications module 210 using any suitable means. For example, as shown in FIG. 4, the sensors 214, 216, 218, 224 are coupled to the sensor interface 212 via a wired connection. However, in other embodiments, the sensors 214, 216, 218, 224 may be coupled to the sensor interface 212 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, detecting an approach of the current condition to a current-dependent limit and affecting a speed of the generator 118 so as to alter a rotor-stator balance of the generator 118 such that the current-dependent limit is not exceeded and the wind turbine 100 can operate at a rated power, as described herein, as well as various other suitable computer-implemented functions.

As shown generally in FIGS. 4-5, the system 200 may include at least one environmental sensor(s) 214 configured for gathering data indicative of at least one environmental condition 226. In an embodiment, the environmental sensor(s) 214 may be configured to detect an environmental condition 226 anticipated to drive the current condition of the generator 118 toward the current-dependent limit. Thus, in an embodiment, the environmental sensor(s) 214 may, for example, be a wind vane, an anemometer, a lidar sensor, thermometer, barometer or other suitable sensor. The data gathered by the environmental sensor(s) 214 may include measure measures of wind speed, wind direction, wind shear, wind gust, wind veer, atmospheric pressure, and/or temperature. In at least one embodiment, the environmental sensor(s) 214 may be mounted to the nacelle 106 at a location downwind of the rotor 108. The environmental sensor(s) 214 may, in alternative embodiments, be coupled to or integrated with the rotor 108. It should be appreciated that the environmental sensor(s) 214 may include a network of sensors and may be positioned away from the wind turbine 100.

The system 200 may also include at least one grid sensor 218 operably coupled to an electrical power grid 184 and to the converter controller 220 or the turbine controller 204. The grid sensor (s) 218 may be configured to detect a grid condition 228 (FIG. 5) anticipated to drive the current condition 230 of the generator 118 to the current-dependent limit.

As shown at 230 of FIG. 5, in an embodiment, the controller 202 of the system 200 may determine a current condition 230 of the generator 118 of the wind turbine 100. Data indicative of the current condition 230 may be provided to the controller 202 via a current sensor 216 operably coupled to the generator 118. As used herein, "current condition" refers to the amount of current flowing through the rotor and stator respectively. The relationship of the current in the rotor of the generator to the current in the stator of the generator may be considered the rotor/stator balance. In an embodiment, as the rotational speed of the generator 118 increases, the rotor may be driven to a higher current while the current demand on the stator may decrease. The opposite may also be true wherein as the rotational speed of the generator 118 decreases, the stator may be driven harder while demand on the rotor may decrease. It should be appreciated that the current condition 230 may also be dependent, at least in part on the environmental condition 226, such as a high ambient temperature, and the electrical grid condition 228.

The physical attributes of the components of the generator 118 may result in current-dependent limits, which are known for the generator 118. In an embodiment, one such limit may be a high-speed limit corresponding to a rotor current limit. Another such limit may be a low-speed limit corresponding to a stator current limit. The high-speed limit may be encountered when the rotational speed of the generator increases to the point where the amount of current passing through the rotor exceeds the rotor's ability to handle the current. Similarly, the low-speed limit may be encountered when the rotational speed of the generator decreases to the point where the amount of current passing through the stator exceeds the stator's ability to handle the current, such as may be encountered when a grid condition drives a low voltage operating mode for the generator 118. The component's ability to handle the current may be dependent on factors related to the construction of the component (wire material, wire diameter, and wire length) and/or environmental conditions, such as temperature. This may result in excessive heat generation, unacceptable insulation system degradation, or other adverse outcomes.

Left uncorrected, a current condition exceeding the rotor current limit may lead to a de-rating of the generator, which reduces power production.

As shown at 232 in FIG. 5, in an embodiment, the controller 202 of system 200 may receive the current condition 230, the grid condition 228, and/or the environmental condition 226 so as to detect an approach of the current condition 230 to a current-dependent limit. In an embodiment, for example, in order to detect the approach to a current-dependent limit, either the turbine controller 204 or the converter controller 220 may receive, from the current sensor 216, an indication of the current condition 230. The controller 202 may also receive data indicative of an electrical grid condition 228 and/or an environmental condition 226. Knowing the electrical grid condition 228 and the environmental condition 226, the controller 202 may determine an operating point for the wind turbine 100 within an operational envelope of the wind turbine 100. The controller 202 may then compute and/or look up the current-dependent limit for the generator 118 for the determined operating point. The controller may then compare the current condition to a known current-dependent limit for the wind turbine 100 operating point so as to detect an approach of the current condition 230 to the current-dependent limit.

In an embodiment, the controller 202 may detect an approach of the current condition 230 to the current-dependent limit and affect a speed of the generator 118 so as to alter a rotor/stator balance of the generator 118 such that the current-dependent limit is not exceeded and the wind turbine 100 can operate at a rated power. By altering the rotor/stator balance, the amount of current flowing to the component approaching the current-dependent limit may be decreased while the amount of current to the other component is increased.

It should be appreciated that affecting the speed of the generator 118 so as to affect the rotor/stator balance may permit establishing a power output of the generator 118 which is greater than a designated power rating for the generator 118, such as a nominal, or design, power rating of the generator 118. This, in turn, may permit the upgrading of the power production capability of the wind turbine without necessitating a replacement of the generator 118. Alternatively, the ability to operate the generator 118 at a higher power output may permit the use of physically smaller generators for a given power output than are presently employed.

As shown at 234 of FIG. 5, the controller 202 may then determine whether the current-dependent limit being approached is a high-speed limit. If the current-dependent limit is a high-speed limit, as shown at 236, then the controller 202 may select an operating parameter (e.g. such as any of the operating parameters in blocks 238, 240, 242, 244) of the wind turbine 100 to adjust in order to slow a shaft speed of the generator 118. In another embodiment, if the current-dependent limit is not a high-speed limit, then, as shown at 246, the controller 202 may select an operating parameter 238, 240, 242, 244 of the wind turbine 100 to adjust in order to increase a shaft speed of the generator 118.

More specifically as shown in FIGS. 4-5, in an embodiment, the system 200 may include at least one rotational speed sensor 224 operably coupled to the turbine controller 204. The rotational speed sensor(s) 224 may be directed at the high-speed shaft 124 of the wind turbine 100. The rotational speed sensor(s) 224 may gather data indicative of the rotational speed 248 of the high-speed shaft 124. The rotational speed sensor(s) 224 may, in an embodiment, be an analog tachometer, a D.C. tachometer, an A.C. tachometer, a digital tachometer, a contact tachometer a non-contact tachometer, or a time and frequency tachometer.

In particular embodiments, such as depicted in FIG. 5, the controller 202 may receive data indicative of the rotational speed 248 from the rotational speed sensor(s) 224. The controller 202 may also receive a pitch setpoint indication 250 (i.e., a current pitch value) for the blades 112 of the rotor 108 of the wind turbine 100 via a pitch sensor 222 of the pitch control mechanism 120. Thus, in an embodiment, the pitch setpoint indication 250 may be considered by the controller 202 in relation to the environmental condition 226. As shown at 236 and 246, the controller 202 may utilize the pitch setpoint indication 250, the rotational speed 248 of the high-speed shaft, and the current condition 230 to select an operating condition 238, 240, 242, 244 for adjustment. In an embodiment, the controller 202 may balance the varying inputs concerning the operation of the wind turbine 100 in order to select an optimal operating parameter 238, 240, 242, 244 for adjustment. It should be appreciated, however, that the controller 202 may, in consideration of the varying inputs, determine that the generator should be de-rated in lieu of adjusting a different operating parameter.

In an embodiment, the controller 202 may select the pitch of the blades 112 of the rotor 108 as the operating parameter to be adjusted so as to affect the shaft speed of the generator 118. To that end, the turbine controller 204 may generate and transmit a pitch setpoint command to the pitch controller 150 of the pitch control mechanism 120. The pitch setpoint command may instruct the pitch control mechanism 120 to pitch at least one blade 112 of the rotor 108 of the wind turbine 100 so as to decelerate the rotor 108 of the wind turbine 100 for the determined environmental condition 226. A deceleration of the rotor 108 may result in the deceleration of the rotor shaft 122, the high-speed shaft 124, and the generator 118, in turn.

In an alternative embodiment, the turbine controller 204 may generate and transmit a pitch setpoint command to the pitch controller 150 of the pitch control mechanism 120. The pitch setpoint command may instruct the pitch control mechanism 120 to pitch the blade(s) 112 of the rotor 108 of the wind turbine 100 so as to accelerate the rotor 108 of the wind turbine 100 for the determined environmental condition 226. An acceleration of the rotor 108 may result in the acceleration of the rotor shaft 122, the high-speed shaft 124 and the generator 118 in turn.

Referring still to FIG. 5, as shown at 238, the controller 202 may select the torque of the generator as the operating parameter to be adjusted in order to affect the shaft speed of the generator 118. To that end, the turbine controller 204 may generate and transmit a torque command to the converter controller 220. Thus, the torque command may instruct the converter controller 220 to increase the torque of the generator 118 so as to decelerate the generator 118. Alternatively, in an embodiment, the torque command may instruct the converter controller 220 to decrease the torque of the generator so as to facilitate the acceleration of the generator 118 by removing a resistance thereto.

In another embodiment, the rotational speed 248 of the generator 118 may be affected by any other suitable means. For example, in at least one embodiment, the high-speed shaft 124 may be decelerated via the application of a braking system of the wind turbine 100. In yet another embodiment, the rotational speed 248 of the high-speed shaft may be affected by modifying a gear ratio of the gearbox 126.

Figure 6:
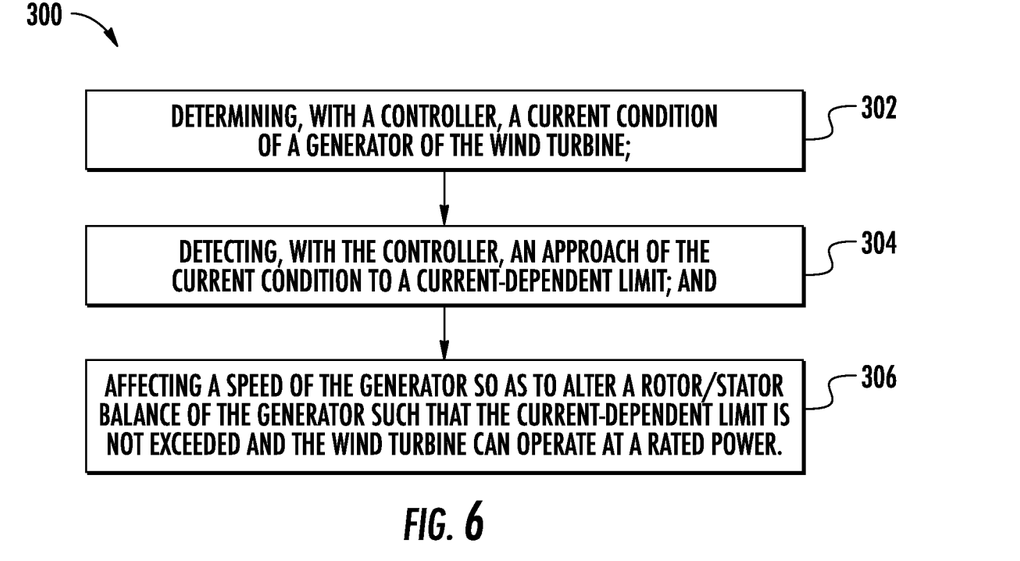
FIG. 6 illustrates a flow diagram of one embodiment of a method for operating a wind turbine according to the present disclosure.

Referring now to FIG. 6, a flow diagram of one embodiment of a method 300 for controlling a wind turbine is illustrated. The method 300 may be implemented using, for instance, the system 200 of the present disclosure discussed above with references to FIGS. 1-5. FIG. 6 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include determining, with a controller, a current condition of a generator of the wind turbine. As shown at (304), the method 300 may include detecting, with the controller, an approach of the current condition to a current dependent limit. Additionally, as shown at (306), the method 300 may include affecting a speed of the generator so as to alter a rotor/stator balance of the generator such that the current-dependent limit is not exceeded in the wind turbine can operate at a rated power.

Figure 7:
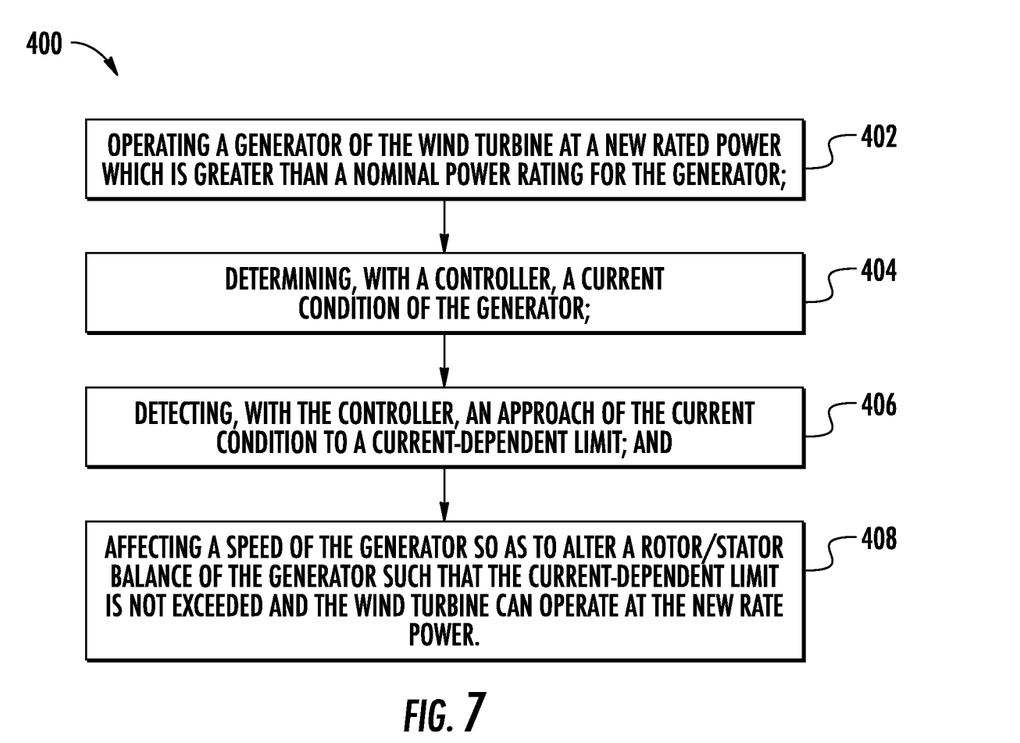
FIG. 7 illustrates a flow diagram of one embodiment of a method for upgrading a power production capability of a wind turbine according to the present disclosure.

Referring now to FIG. 7, a flow diagram of one embodiment of a method 300 for controlling a wind turbine is illustrated. The method 400 may be implemented using, for instance, the system 200 of the present disclosure discussed above with references to FIGS. 1-5. FIG. 7 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include operating the generator of the wind turbine at a new rated power which is greater than a nominal power rating for the generator. As shown at (404), the method 400 may include determining, with a controller, a current condition of a generator. Additionally, as shown at (406), the method 400 may include detecting, with the controller, an approach of the current condition to a current dependent limit. As shown at (408), the method 400 may also include affecting a speed of the generator so as to alter a rotor/stator balance of the generator such that the current-dependent limit is not exceeded in the wind turbine can operate at the new rated power.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine, the method comprising determining, with a controller, a current condition of a generator of the wind turbine; detecting, with the controller, an approach of the current condition to a current-dependent limit; and affecting a speed of the generator so as to alter a rotor/stator balance of the generator such that the current-dependent limit is not exceeded and the wind turbine can operate at a rated power.

Clause 2. The method of any preceding clause, wherein the method further comprises receiving, with the controller, data indicative of an electrical grid condition; receiving, with the controller, data indicative of an environmental condition; determining the current condition based, at least in part, on the grid condition and the environmental condition.

Clause 3. The method of any preceding clause, wherein the current-dependent limit is a high-speed limit of the generator corresponding to a rotor current limit of the generator.

Clause 4. The method of any preceding clause, wherein affecting the speed of the generator further comprises adjusting an operating parameter of the wind turbine so as to slow a shaft speed of the generator.

Clause 5. The method of any preceding clause, wherein adjusting the operating parameter of the wind turbine further comprises receiving, with the controller, a pitch setpoint of at least one rotor blade of the wind turbine at the environmental condition; receiving, with the controller, data indicative of a rotational speed for a high-speed shaft of the wind turbine; and selecting, with the controller, the operating parameter based on the pitch setpoint, the rotational speed of the high-speed shaft, and the current condition of the generator.

Clause 6. The method of any preceding clause, wherein adjusting the operating parameter of the wind turbine further comprises increasing the torque of the generator.

Clause 7. The method of any preceding clause, wherein adjusting the operating parameter of the wind turbine further comprises pitching at least one rotor blade of the wind turbine so as to decelerate a rotor of the wind turbine for the environmental condition.

Clause 8. The method of any preceding clause, wherein the current-dependent limit is a low limit corresponding to a stator current limit of the generator.

Clause 9. The method of any preceding clause, wherein affecting the speed of the generator further comprises adjusting an operating parameter of the wind turbine so as to increase a shaft speed of the generator.

Clause 10. The method of any preceding clause, wherein adjusting the operating parameter of the wind turbine further comprises receiving, with the controller, a pitch setpoint of at least one rotor blade of the wind turbine at the environmental condition; receiving, with the controller, data indicative of a rotational speed for a high-speed shaft of the wind turbine; selecting, with the controller, the operating parameter for adjustment based on the pitch setpoint, the rotational speed of the high-speed shaft, and the current condition.

Clause 11. The method of any preceding clause, wherein adjusting the operating parameter of the wind turbine further comprises decreasing the torque of the generator.

Clause 12. The method of any preceding clause, wherein adjusting the operating parameter of the wind turbine further comprises pitching at least one rotor blade of the wind turbine so as to accelerate a rotor of the wind turbine for the environmental condition.

Clause 13. The method of any preceding clause, further comprising establishing a power output of the generator which is greater than a nominal power rating for the wind turbine.

Clause 14. A system for controlling a wind turbine, the system comprising a current sensor operably coupled to a generator of a wind turbine; a converter controller operably coupled to the current sensor and the generator, the converter controller configured to determine a current condition of the generator and to detect an approach of the current condition to a current-dependent limit; and a turbine controller operably coupled to the converter controller, the turbine controller being configured to affect the speed of the generator such that the current-dependent limit is not exceeded and the wind turbine can operate at a rated power.

Clause 15. The system of any preceding clause, further comprising a grid sensor operably coupled an electrical power grid and to the converter controller or the turbine controller, the grid sensor being configured to detect a grid condition anticipated to drive the current condition to the current-dependent limit.

Clause 16. The system of any preceding clause, further comprising an environmental sensor operably coupled to the turbine controller for gathering data indicative of an environmental condition, the environmental sensor being configured to detect an environmental condition anticipated to drive the current condition to the current-dependent limit.

Clause 17. The system of any preceding clause, further comprising a pitch sensor operably coupled to at least one blade of a rotor of the wind turbine and the turbine controller, the pitch sensor being configured communicate a pitch setpoint indication to the turbine controller; and a rotational speed sensor operably coupled to the turbine controller, the rotational speed sensor being directed at a high-speed shaft of the wind turbine, wherein the turbine controller is configured select an operating parameter to adjust so as to affect the speed of the generator based at least on the pitch setpoint of the rotor in relation to the environmental condition, the rotational speed of the high-speed shaft, and the current condition of the generator.

Clause 18. The system of any preceding clause, further comprising a blade pitch control mechanism operably coupled to at least one blade of the rotor of the wind turbine so as to establish the pitch setpoint for the at least one blade based upon a pitch setpoint command received from the turbine controller, the pitch setpoint command being determined so as to slow a rotational speed of the rotor.

Clause 19. The system of any preceding clause, further comprising a power converter operably coupled to the generator and the turbine controller, the converter being configured to increase a torque parameter of the generator so as to reduce a generator speed setpoint when the current-dependent limit is a high-speed limit corresponding to a rotor current limit of the generator and decrease a torque parameter of the generator so as to increase a generator speed setpoint when the current-dependent limit is a low-speed limit corresponding to a stator current limit of the generator.

Clause 20. A method for upgrading a power production capability of a wind turbine, the method comprising operating a generator of the wind turbine at a new rated power which is greater than a nominal power rating for the generator; determining, with a controller, a current condition of the generator; detecting, with the controller, an approach of the current condition to a current-dependent limit; and affecting a speed of the generator so as to alter a rotor/stator balance of the generator such that the current-dependent limit is not exceeded and the wind turbine can operate at the new rated power.

What is claimed is:

1. A method for controlling a generator of a wind turbine, the generator having a rotor and a stator, the method comprising:
   detecting, with a controller, a respective amount of electrical current in each of the rotor of the generator and the stator of the generator of the wind turbine;
   determining, with the controller, whether the respective amounts of electrical current in each of the rotor of the generator and the stator of the generator exceed respective electrical current thresholds of the rotor of the generator and the stator of the generator, wherein each of the respective electrical current thresholds corresponds to a maximum power rating for the rotor of the generator and the stator of the generator, respectively; and
   adjusting a speed of the generator so as to alter a ratio of the amount of electrical current in the rotor of the generator to the amount of electrical current in the stator of the generator such that the respective electrical current thresholds of the rotor of the generator and the stator of the generator are not exceeded and the wind turbine operates at a nominal power rating.

2. The method of claim 1, wherein the method further comprises:
   receiving, with the controller, data indicative of an electrical grid condition;
   receiving, with the controller, data indicative of an environmental condition at the wind turbine;
   determining the amount of electrical current in the rotor of the generator and the amount of electrical current in the stator of the generator based, at least in part, on the data indicative of the grid condition and on the data indicative of the environmental condition.

3. The method of claim 2, further comprising adjusting an operating parameter of the wind turbine so as to adjust a shaft speed of the generator by increasing or decreasing the shaft speed of the generator.

4. The method of claim 3, wherein adjusting the operating parameter of the wind turbine further comprises:
   receiving, with the controller, a pitch setpoint indication of at least one rotor blade of a rotor of the wind turbine at the environmental condition;
   receiving, with the controller, data indicative of a rotational speed for of a high-speed shaft of the wind turbine; and selecting, with the controller, the operating parameter based on:
the pitch setpoint indication,
the data indicative of the rotational speed of the high-speed shaft, and
the respective amounts of electrical current in each of the rotor of the generator and the stator of the generator.

5. The method of claim 3, wherein adjusting the operating parameter of the wind turbine comprises increasing a torque of the generator.

6. The method of claim 3, wherein adjusting the operating parameter of the wind turbine comprises pitching at least one rotor blade of a rotor of the wind turbine so as to decelerate the rotor of the wind turbine.

7. The method of claim 3, wherein adjusting the operating parameter of the wind turbine further comprises:
receiving, with the controller, a pitch setpoint indication of at least one rotor blade of a rotor of the wind turbine and receiving, with the controller, the data indicative of the environmental condition at the wind turbine;
receiving, with the controller, data indicative of a rotational speed for of a high-speed shaft of the wind turbine;
selecting, with the controller, the operating parameter for adjustment based on:
the pitch setpoint indication,
the data indicative of the rotational speed of the high-speed shaft, and
the respective amounts of electrical current in each of the rotor of the generator and the stator.

8. The method of claim 3, wherein adjusting the operating parameter of the wind turbine comprises decreasing a torque of the generator.

9. The method of claim 3, wherein adjusting the operating parameter of the wind turbine comprises pitching at least one rotor blade of a rotor of the wind turbine so as to accelerate the rotor of the wind turbine.

10. A system for controlling a wind turbine, the system comprising:
a current sensor operably coupled to a rotor of a generator of the wind turbine and to a stator of the generator of the wind turbine;
a converter controller operably coupled to the current sensor and to the generator, the converter controller configured to:
determine respective amounts of electrical current in each of the rotor of the generator and the stator of the generator, and
detect whether the respective amounts of electrical current in each of the rotor of the generator and the stator of the generator exceed respective electrical current thresholds of the rotor of the generator and the stator of the generator, wherein each of the respective electrical current thresholds corresponds to a maximum power rating for the rotor of the generator and the stator of the generator, respectively; and
a turbine controller operably coupled to the converter controller, the turbine controller being configured to adjust a speed of the generator so as to alter a ratio of the amount of electrical current in the rotor of the generator to the amount of electrical current in the stator of the generator such that the respective electrical current thresholds of the rotor of the generator and the stator of the generator are not exceeded and the wind turbine operates at a nominal power rating.

11. The system of claim 10, further comprising a grid sensor operably coupled to an electrical power grid and to one of the converter controller or to the turbine controller, the grid sensor being configured to detect an electrical grid condition anticipated to drive the respective amounts of electrical current in each of the rotor of the generator and the stator of the generator to the respective electrical current thresholds of the rotor of the generator and the stator of the generator.

12. The system of claim 11, further comprising an environmental sensor operably coupled to the turbine controller for gathering data indicative of an environmental condition at the wind turbine anticipated to drive the respective amounts of electrical current in each of the rotor of the generator and the stator of the generator to the respective electrical current thresholds of the rotor of the generator and the stator of the generator.

13. The system of claim 12, further comprising:
a pitch sensor operably coupled to at least one blade of a rotor of the wind turbine and to the turbine controller, the pitch sensor being configured to communicate a pitch setpoint indication of the blade to the turbine controller, and
a rotational speed sensor operably coupled to the turbine controller, the rotational speed sensor detecting a rotational speed of a high-speed shaft of the wind turbine,
wherein the turbine controller is configured to select an operating parameter to adjust so as to adjust the speed of the generator based at least on:
the pitch setpoint indication of the blade at the environmental condition at the wind turbine,
the rotational speed of the high-speed shaft, and
the respective amounts of electrical current in each of the rotor of the generator and the stator of the generator.

14. The system of claim 10, further comprising:
a blade pitch control mechanism operably coupled to at least one blade of a rotor of the wind turbine to pitch the at least one blade based upon a pitch setpoint command received from the turbine controller, the pitch setpoint command being determined so as to slow a rotational speed of the rotor of the generator.

15. The system of claim 10, further comprising:
a power converter operably coupled to the generator and to the turbine controller, the power converter being configured to increase a torque parameter of the generator so as to reduce a generator speed setpoint of the generator.

16. A method for upgrading a power production capability of a wind turbine, the method comprising:
operating a rotor of a generator of the wind turbine and a stator of the generator at a power rating that is greater than a nominal power rating for the generator;
determining, with a controller, a respective amount of electrical current in each of the rotor of the generator and the stator of the generator;
detecting, with the controller, whether the respective amounts of electrical current in each of the rotor of the generator and the stator of the generator exceed respective electrical current thresholds of the rotor of the generator and the stator of the generator, wherein each of the respective electrical current thresholds corresponds to a maximum power rating for the rotor of the generator and the stator of the generator, respectively; and
when at least one of the amount of the electrical current of the rotor of the generator or the amount of the electrical current of the stator of the generator exceeds the respective electrical current threshold, adjusting a ratio of the amount of electrical current in the rotor of the generator to the amount of electrical current in the stator of the generator via altering a speed of the generator such that the respective electrical current thresholds of the rotor of the generator and the stator of the generator are not exceeded and the wind turbine operates at the power rating that is greater than the nominal power rating.

* * * * *